United States Patent Office 3,342,807
Patented Sept. 19, 1967

3,342,807
IMINODIBENZYL DERIVATIVES
Henri Dietrich, Arlesheim, Basel-Land, Switzerland, assignor to Geigy Chemical Corporation, Greenburgh, N.Y., a corporation of Delaware
No Drawing. Filed July 10, 1964, Ser. No. 381,886
Claims priority, application Switzerland, Feb. 17, 1961, 1,920/61, 1,921/61
6 Claims. (Cl. 260—239)

This application is a continuation-in-part of my pending application Ser. No. 173,805, filed Feb. 16, 1962, and now abandoned.

The present invention concerns new iminodibenzyl derivative substituted by a 3-alkyl sulfonyl groups as well as processes for the preparation of same. Compounds according to the invention show valuable pharmacological properties or are intermediate products for the preparation of such compounds.

In one aspect, this invention involves compounds of Formula I

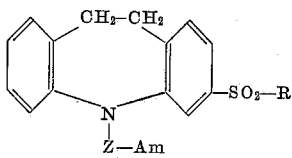

wherein
R is the methyl or ethyl radical,
Z is a straight or branched chain alkylene radical having from 2 to at most 4 carbon atoms, e.g.
—CH₂—CH₂—, —CH₂—CH₂—CH₂—
CH₂—CH(CH₃)—, —CH(CH₃)—CH₂—
    —CH₂—CH₂—CH₂—CH₂—
    —CH₂—CH(CH₃)—CH₂—
    —CH(CH₃)—CH₂—CH₂—
    —CH₂—CH₂—CH(CH₃)— etc.,
Am is a lower alkylamino group having from one to at most four carbon atoms, e.g. methyl amino, ethylamino, propylamino, isopropylamino, butylamino etc., a lower dialkylamino group, e.g. dimethylamino, methylethylamino, diethylamino, methylpropylamino, methylthlisopropylamino, dipropylamino, dibutylamino etc., and wherein one alkyl radical of "Am" can be bound directly with the alkylene radical Z, e.g. β-(1-methyl-2-pyrrolidinyl)-ethyl-, 1-methyl-3-pyrrolidinyl-methyl-, β-(1-methyl-2-piperidinyl)-ethyl, 1-methyl-3-piperidinylmethyl or 1-methyl-4-piperidinyl, or wherein both alkyl radicals of a dialkylamino group Am can be linked together directly or by means of oxygen, a lower alkylamino, hydroxyalkylimino or alkanoyloxyalkylimino group e.g. 1-pyrrolidinyl, piperidino, hexamethylenimino, morpholino, 4-methyl-1-piperazinyl, 4-isopropyl-1-piperazinyl, 4-(β-hydroxyethyl)-1-piperazinyl, 4-(β-acetoxyethyl)-1-piperazinyl or 4-(β-hydroxy-n-propyl)-1-piperazinyl,
as well as the non-toxic, pharmaceuticaly acceptable acid addition salts thereof with inorganic or organic acids.

As mentioned above, compounds of the Formula I have valuable pharmacological properties; those compounds falling under Formula I in which —Z—Am represents 3'-mono-lower alkylamino or 3'-di-(lower alkyl)-amino substituted alkylene having from 3 to at most 4 carbon atoms, and more particularly those having a 3'-mono- or 3'-di-lower alkylamino-2'-methyl-propyl side chain as shown in the formula

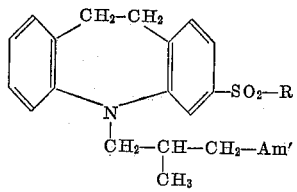

wherein Am' represents mono- or di-lower alkylamino and R has the above given meaning, especially those with a 3-dimethylamino-2'-methyl-propyl sidechain have strong adrenolytic and antiemetic properties not possessed by the 3-unsubstituted parent compound, 5-(3'-dimethylamino-2'-methylpropyl)-iminodibenzyl, whereas their antihistaminic property of useful magnitude in the aforesaid parent compound is virtually suppressed. Also their anticholingeric property is much weaker than that of the aforesaid parent compound.

This unexpected combination of properties renders the compounds of Formula I–A useful in the therapy of vegetative dysfunction, while the aforesaid parent compound does not possess this utility.

To produce the new compounds of general Formula I, a reactive ester, especially a halide, of the general formula

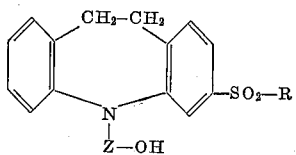

wherein R and Z have the meanings given above, is reacted with the amine of the general formula Am—H    III wherein Am has the meaning given above, naturally no linkage being present between the alkyl radical of Am and Z. The reaction can be carried out for instance at a moderately high temperature of e.g. 60–120°, in an inert solvent, such as e.g. a low molecular alkanol or alkanone, it being practical to have an excess of the reaction amine as acid binding agent. Depending on the boiling point of the amine and of the solvent employed as well as on the temperature required for the reaction, if necessary the reaction is carried out in a closed vessel.

Reactive esters of the general Formula II are formed for example by reacting alkali metal derivatives of 3-methyl- or 3-ethyl-sulphonyl-iminodibenzyls with alkylene oxides and reacting the resulting hydroxyalkyl derivatives with inorganic acid halides, methane sulphonic acid chloride, or with arylsulphonic acid chlorides whereupon the 5-haloalkyl-, 5-methane-sulphonyloxyalkyl-, or 5-aryl-sulphonyloxyalkyl-3-allylsulphonyl-iminodibenzyls are obtained. Such compounds can also be prepared in one step, by reacting the alkali metal compounds of 3-methyl- or 3-ethyl-sulphonyl-imino-dibenzyls with non-geminal dihaloalkanes, especially with those having two different halogen atoms, or else with arylsulphonic acid haloalkyl esters.

The reactive esters of the general Formula II, can be reacted for example with dimethylamine, methyl-ethyl-amine, diethylamine, di-n-butylamine, methylamine, ethylamine, n-propylamine, n-butylamine, pyrrolidine, piperidine, hexamethylenimine, morpholine, 4-methyl-piperazine, 4-(β-hydroxy-ethyl)-piperazine or with 4-(β-acetoxy-ethyl)-piperazine.

A further process for the production of compounds of the general Formula I consists in treating a compound of the general formula

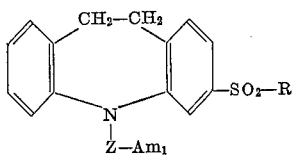

IV wherein $Am_1$ is a primary amino radical or a low mono-alkylamino radical, the alkyl radical of which can also be bound with Z, and R and Z have the meanings given above with a low alkylating agent.

Starting materials of the general Formula IV are prepared for instance by a process analogous to the one described above i.e. by reacting ammonia or a mono-alkylamine (as in that process) with a reactive ester of a compound of the general Formula II, furthermore e.g. by reduction or hydrogenation of a 5-cyanalkyl-3-methyl- or 3-ethyl-sulphonyl-iminodibenzyl. For example dimethylsulphate, di-ethylsulphate, methyliodide, ethyliodide, ethylbromide, n-propyl-bromide, p-toluenesulphonic-acid-methyl ester and 2,4 - dinitrobenzene-sulphonic-acid-methyl ester are useful low alkylating agents, in the presence of such acid binding agents, as e.g. sodium- or potassiumcarbonate, and in an inert organic solvent and of e.g. formaldehyde in the presence of formic acid.

A third process for the production of compounds of the general Formula I, wherein the Am radical has no reactive hydrogen consists in reacting a compound of the general formula

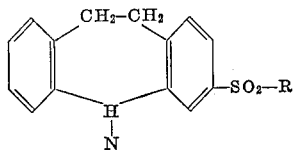

V wherein R has the meaning given above, in the presence of a basic condensing agent, with a reactive ester of an amino alcohol of the general formula

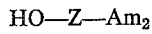  HO—Z—$Am_2$    VI wherein $Am_2$ has the meaning given above for Am, except that it is not a low alkyl-amino radical and Z has the meaning given above.

Especially suitable condensing agents are sodium amide, lithium amide, potassium amide, sodium or potassium, butyllithium, phenyl-lithium or lithium hydride. The reaction can take place in or without an inert organic solvent, such as e.g. benzene, toluene and xylene.

Especially the halides are employed as reactive esters of amino alcohols of the general Formula VI. Individually can be mention:

β-Dimethylamino-ethyl chloride,
β-diethylamino-ethyl chloride,
β-methyl-ethylamino-ethyl chloride,
β-dimethyl-amino-propyl chloride,
β-dimethylamino-isopropyl chloride,
γ-dimethyl-amino-propyl chloride,
γ-dimethylamino-butyl chloride,
δ-dimethylamino-butyl chloride,
γ-dimethylamino-β-methyl-propyl chloride,
α-methyl-γ-dimethylamino-n-amyl chloride,
β-di-n-propylamino)-ethyl chloride,
β-(methyl-isopropylamino)-ethyl chloride,
β-di-n-butylamino)-ethyl chloride,
β-(di-isobutylamino)-ethyl chloride,
β-(1-pyrrolidinyl)-ethyl chloride,
β-piperidino-ethyl chloride,
γ-(1-pyrrolidinyl)-propyl chloride,
γ-piperidino-propyl chloride,
β-morpholino-ethyl chloride,
γ-morpholino-propyl chloride,
β-(4-methyl-1-piperazinyl)-ethyl chloride,
γ-(4-methyl-1-piperazinyl)-propyl chloride,
β-[4-(β-acetoxy-ethyl)-1-piperazinyl]-ethyl chloride,
γ-[4-(β-acetoxy-ethyl)-1-piperazinyl]-propyl chloride,
β-(1-methyl-2-pyrrolidinyl)-ethyl chloride,
β-(1-methyl-2-piperidyl)-ethyl chloride, and
(1-methyl-3-piperidyl)-methyl chloride, as well as the corresponding bromides and iodides.

A fourth process for the production of iminodibenzyl derivatives of the general Formula I consists of heating a compound of the general formula

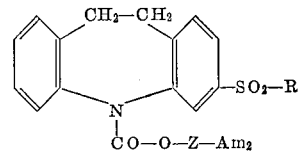

VII wherein R, Z, and $Am_2$ have the meanings given above, until one mol of carbon dioxide is liberated. Compounds of the general Formula VII are prepared in their turn e.g. by treating 3-methyl- or 3-ethyl-sulphonyl-iminodibenzyls with phosgene and reacting the 3-alkylsulphonyl-5-chlorocarbonyl-iminodibenzyls so produced with amino alcohols of the general Formula VI.

Finally the compounds of the general Formula I, wherein Am is a low alkylamino radical, the alkyl radical of which can be bound directly to Z, are prepared by treating compounds of the general formula

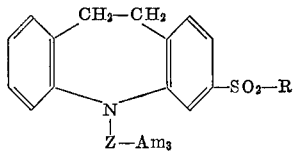

VIII wherein $Am_3$ is a low N-arylmethyl-alkylamino radical or N-acyl-alkylamino radical, the alkyl radical of which can be bound directly to Z.

and R and Z have the meanings given above, depending on the meaning of $Am_3$, either with catalytically activated hydrogen or with a hydrolysing agent.

Compounds of the general Formula VIII wherein $Am_3$ is an aryl-methyl radical such as a benzyl group are reacted for example with hydrogen in the presence of Raney-nickel, at temperatures of up to about 80° and under pressures of up to 50 atmospheres, until a substantially equimolar amount of hydrogen has been taken up.

The hydrolytic cleavage of such an acyl group in the $Am_3$ radical as the acetyl, the benzoyl, the barbethoxy or the methane-sulphonyl radical takes place under the usual conditions for amide hydrolysis e.g. boiling in alcoholic soda or potash lye.

Starting materials of the general Formula VIII can be prepared for example by methods analogous to some of the processes serving for the production of compounds of general Formula I. Especially reactive esters of the compounds of the general Formula II can be reacted, analogously to the first process with compounds of the general formula

wherein $Am_3$ has the meaning given above or with alkali metal derivatives of compounds of the general Formula IX, wherein $Am_3$ contains an acyl group. Furthermore starting materials of the general Formula VIII are produced, analogously to the third process described above, by reacting in the presence of basic condensing agents, compounds of the general Formula V with reactive esters of hydroxy compounds of the general formula

wherein Z and $Am_3$ have the meanings given above.

The tertiary bases form salts, some of which are water-soluble with inorganic and organic acids such as hydrochloric acid, hydrobromic acid, sulphuric acid, phosphoric acid, methane sulphonic acid, ethane disulphonic acid, β-hydroxy-ethane sulphonic acid, acetic acid, succinic acid, fumaric acid, maleic acid, malic acid, tartaric acid, citric acid, bonzoic acid, salicylic acid and mandelic acid.

The following examples illustrate the production of the new compounds. Parts therein are parts by weight, their relationship to parts by volume is as that of grammes to cubic centimetres. The temperatures are in degrees centigrade.

Example 1

(a) 25.2 parts of 3-amino-5-acetyl-iminodibenzyl are dissolved with heating in 50 parts by volume of concentrated hydrochloric acid and 150 parts by volume of water. On cooling and stirring, fine crystals of the hydrochloride are formed, 7 parts of solid sodium nitrite are added to the ice cooled suspension which is stirred until the solution has cleared. Thereupon the solution is poured into 500 parts by volume of glacial acetic acid saturated with sulfur dioxide and containing 3 parts of copper-(II)-chloride. The nitrogen development sets in immediately, sulfur dioxide being continuously introduced, and stops after about an hour. The reaction mixture is diluted with ice and water, upon which the chlorosulfonyl compound crystallises out so that it can be filtered off. The crude product is purified by dissolving in benzene and then precipitating with petroleum ether or else by recrystallising from a little benzine. The 3-chlorosulfonyl-5-acetyl-iminodibenzyl melts at 173.5–174°.

(b) 35 parts by volume of hydrochloric acid are added to a solution of 33.6 parts of 3-chlorosulfonyl-5-acetyl-iminodibenzyl in glacial acetic acid. While stirring and cooling 20 grams of zinc dust are added in portions. After stirring for 4½ hours at 15°, the excess zinc is filtered off and the solution is concentrated in vacuo. Water is added to the residue and the sulfinic acid is extracted with chloroform. The pure 5-acetyl-iminodibenzyl-3-sulfinic acid decomposes at 154° (from acetone-ether).

(c) 30.1 parts of 5-acetyl-iminodibenzyl-3-sulfinic acid are added to a solution of 2.3 parts sodium in 250 parts by volume of absolute ethanol and reacted with 16 parts methyliodide. Upon refluxing for 4 hours, the ethanol is distilled off. The residue is taken up in chlofom and washed with a little water.

The dried chloroform solution is concentrated and petroleum ether is added. The crystals of pure 3-methylsulfonyl-5-acetyl-iminodibenzyl which separate out melt at 162.5–164.5° after being recrystallized from a small amount of 85% ethanol.

(d) 31.5 parts of 3-methylsulfonyl-5-acetyl-iminodibenzyl are hydrolised by being refluxed for 16 hours with 25 parts of potassium hydroxide in 500 parts by volume ethylene glycol. The reaction mixture is then poured into water and the crystals are filtered off. Recrystallised from ether, pure 3-methylsulfonyl-iminodibenzyl melts at 175–176°.

(e) 27.3 parts of 3-methylsulfonyl-iminodibenzyl are dissolved in 700 parts by volume of xylene at 80° and 3-dimethylaminopropyl chloride (liberated from 16 parts of the hydrochloride and taken up in xylene) is added.

Thereupon 4.3 parts of pulverised sodium amide in toluene are added and the reaction mixture is refluxed for 15 hours at 100° with stirring. On cooling, the crude base is extracted with dilute hydrochloride acid, the extract is neutralised and the crystals are filtered off. Recrystallised from hexane, the 3-methylsulfonyl-5-(γ-dimethylaminopropyl)-iminodibenzyl melts at 110–110.5°.

(f) On using the following starting materials instead of 3-dimethylamino-propyl chloride in Example 1e, the following products are obtained: 14.8 g. β-piperidino-ethyl chloride gives 3-methylsulfonyl-5-(β-piperidino-ethyl)-iminodibenzyl, 17.6 g. γ-hexamethyleneimino-propyl chloride gives 3-methylsulfonyl-5-(γ-hexamethylene-imino-propyl)-iminodibenzyl, 15.0 g. (β-morpholino-ethyl chloride gives 3-methylsulfonyl-5-(β-morpholino-ethyl)-iminodibenzyl, 14.8 g. β-(1-methyl-2-pyrrolidinyl)-ethyl chloride gives 3-methylsulfonyl-5-[β-(1-methyl-2-pyrrolidinyl)-ethyl]-iminodibenzyl, and 13.4 g. 1-methyl-4-piperidinyl chloride gives 3-methylsulfonyl-5-(1-methyl-4-piperidinyl)-iminodibenzyl.

Example 2

(a) 30.1 parts of 5-acetyl-iminodibenzyl-3-sulphinic acid, produced according to Example 1a, are added to the solution of 2.3 parts of sodium in 200 parts by volume of abs. ethanol. Up to 100 parts of ethyl bromide are added to this solution over a period of 8 hours and the whole is refluxed. (If evaporation losses of ethyl bromide are avoided by a very effective condenser, then the amount of ethyl bromide can be reduced to an equimolecular amount.) Sodium bromide begins to crystallise out and, after about 10 hours, the solution is evaporated to dryness. The residue is taken up in benzene and washed with water. The dried benzene solution is evaporated and the residue is recrystallised from alcohol. The pure 3-ethylsulphonyl-5-acetyl-iminodibenzyl melts at 117–119°.

(b) 32.9 parts of 3-ethylsulphonyl-5-acetyl-iminodibenzyl and 25 parts of potassium hydroxide in 400 parts by volume of ethylene glycol are refluxed for 15 hours. The solution is concentrated to half its volume and poured into 1000 parts by volume of water. The product which precipitates is filtered off. Recrystallised from a little benzene, the pure 3-ethylsulphonyl-iminodibenzyl melts at 130.5–132°.

(c) 28.7 parts of this product are reacted analogously to Example 1d with 3-dimethylamino-propyl chloride whereupon 3-ethylsulphonyl-5-(γ-dimethylamino-propyl)-iminodibenzyl is obtained.

Example 3

27.3 parts of 3-methylsulphonyl-iminodibenzyl are dissolved at 80° in 800 parts by volume of abs. xylene and 19 parts of 3-(4-methyl-1-piperazinyl)-2-methyl-propyl chloride are added. 4.3 parts of sodium amide pulverised in toluene are added dropwise and the reaction mixture is stirred for 17 hours at 130°. After cooling, the base is extracted with diluted hydrochloric acid, made alkaline and taken up in chloroform. After evaporating the dried solution, an oil remains which is purified by chromatographing through a column of neutral $Al_2O_3$ with benzene. The 3-methylsulphonyl-5-[2-methyl-3-(4-methyl-1-piperazinyl-propyl]-iminodibenzyl forms a hydroscopic dihydrochloride. Melting point of the free base 126–127°.

Example 4

28.7 parts of 3-ethylsulphonyl-iminodibenzyl are dissolved at 80° in 800 parts by volume of abs. xylene and 17.7 parts of 3-(4-methyl-1-piperazinyl)-propyl chloride and 4.3 parts of sodium amide pulverised in toluene are added. The reaction mixture is stirred for 18 hours at 135° and then concentrated to half its volume. The sodium chloride formed is filtered off, the solution is chromatographed in a column of neutral Al₂O₃ and eluted with benzene. The pure 3-ethylsulphonyl-5-[3-(4-methylpiperazinyl)-propyl]-iminodibenzyl forms a hygroscopic dihydrochloride.

*Example 5*

27.3 parts of 3-methylsulphonyl-iminodibenzyl are dissolved at 80° in 800 parts by volume of abs. xylene and 19.8 parts of 2-(1-methyl-2-piperidyl)-ethyl chloride-hydrochloride are added. 8.6 parts of sodium amide pulverised in toluene are then added dropwise and the reaction mixture is stirred for 17 hours at 130°. After cooling, the base is extracted with dilute hydrochloric acid, the extract is made alkaline and taken up in chloroform. After concentrating the dried solution, an oil which is crude 3-methylsulphonyl-5-[2-(1-methyl-2-piperidyl)-ethyl]-iminodibenzyl remains. It is purified by chromatographing through a column of neutral Al₂O₃ first with benzene and then with ether. The main part is eluted with ether. On concentrating, the free base crystallises. Recrystallised from benzene or ether, the pure product melts at 138.5–139.5°.

*Example 6*

28.7 parts of 3-ethylsulphonyl-iminodibenzyl are dissolved at 85° in 800 parts by volume of abs. xylene and 19.8 parts of 2-(1-methyl-2-piperidyl)-ethyl chloride-hydrochloride are added. 8.6 parts of sodium amide pulverised in toluene are then added dropwise and the reaction mixture is stirred for 17 hours at 130°. After cooling, the base is extracted with dilute hydrochloric acid, the extract is made alkaline and taken up in chloroform. After concentrating the dried solution, an oil which is crude 3 - ethylsulphonyl - 5-[2-(1-methyl-2-piperidyl)-ethyl]-iminodibenzyl, remains. It is purified by chromatographing through a column of neutral Al₂O₃ with benzene.

*Example 7*

27.3 parts of 3-methylsulphonyl-iminodibenzyl are dissolved at 80° in 800 parts by volume of abs. xylene and 20.9 parts of 3-dimethylamino-1-butyl chloride-hydrochloride are added. 8.6 parts of sodium amide pulverised in toluene are then added dropwise and the reaction mixture is stirred for 17 hours at 130°. After cooling, the base is extracted with 2 N-hydrochloric acid, the extract is made alkaline and taken up in ether. After concentrating the dried ethereal solution, 3-methylsulphonyl-5-(3-dimethylamino-butyl)-iminodibenzyl remains as an oil.

*Example 8*

28.7 parts of 3-ethylsulphonyl-iminodibenzyl are dissolved at 80° in 800 parts by volume of abs. xylene and 20.9 parts of 3-dimethylamino-1-butyl chloride-hydrochloride are added. 8.6 parts of sodium amide pulverised in toluene are then added dropwise and the reaction mixture is stirred for 17 hours at 130°. After cooling, the base is extracted with 2 N-hydrochloric acid, the extract is made alkaline and taken up in ether. After concentrating the dried ethereal solution, the 3-methylsulphonyl-5-(3-dimethylamino-butyl)-iminodibenzyl remains as an oil.

*Example 9*

(a) 12.2 parts of 3-dimethylamino-1-propyl chloride are dissolved in 150 parts by volume of benzene and 27.5 parts by volume of chloroformic acid ethyl ester are added dropwise while stirring. The reaction is exothermic, methyl chloride being strongly developed. The mixture is refluxed for 1 hour and then washed with dilute hydrochloric acid and water. The dried benzene solution is concentrated. The 3-(N-methyl-N-carbethoxy-amino)-1-propyl chloride is then distilled off under reduced pressure and boils at 108–109° under 14 mm. Hg pressure.

(b) 27.3 parts of 3-methylsulphonyl-iminodibenzyl are dissolved at 90° in 850 parts by volume of abs. xylene and 18 parts of 3-(N-methyl-N-carbethoxy-amino)-1-propyl chloride are added. After 4.3 parts of sodium amide pulverised in toluene have been added dropwise, the reaction mixture is stirred for 20 hours at 130°. After cooling, the reaction mixture is washed with water and the dried xylene solution is concentrated.

The crude 3-methylsulphonyl-5-[3-(N-methyl-N-carbethoxy - amino) - propyl]-iminodibenzyl so obtained is worked up direct.

(c) 41.7 parts of this product in 120 parts by volume of ethylene glycol and 40 parts of KOH are saponified for 8 hours at 180°. The cooled reaction mixture is then diluted with 800 parts by volume of water and the 3-methylsulphonyl - 5 - (3-methylamino-propyl)-iminodibenzyl is thoroughly extracted with ether. On adding ethereal hydrochloric acid to the dried ether solution, the hydrochloride is obtained in crystalline form.

*Example 10*

27.3 parts of 3-methylsulphonyl-iminodibenzyl are dissolved at 80° in 800 parts by volume of abs. xylene and 20.9 parts of 3-dimethylamino-2-methyl-1-propyl chloride-hydrochloride are added. 8.6 parts of sodium amide pulverised in toluene are then added and the reaction mixture is stirred for 17 hours at 135°. After cooling, the base is extracted with 2 N-hydrochloric acid, the extract is made alkaline and taken up in ether. After concentrating the dried ether solution, the base remains as an oil. The hydrochloride is produced from this base in the usual way. It is recrystallised from a great deal of methylethyl ketone. The 3 - methylsulphonyl-5-[(3-dimethylamino-2-methyl)-propyl]-iminodibenzyl hydrochloride melts at 229–231°.

*Example 11*

28.7 parts of 3-ethylsulphonyl-iminodibenzyl are dissolved at 80° in 800 parts by volume of abs. xylene and 21 parts of 3-dimethylamino-2-methyl-1-propyl chloride-hydrochloride are added. 8.6 parts of sodium amide pulverised in toluene are then added dropwise and the reaction mixture is stirred for 17 hours at 135°. After cooling, the base is extracted with 2 N-hydrcohloric acid, the extract is made alkaline and taken up in ether. After concentrating the dried ether solution, the base remains as an oil. The hydrochloride is produced in the usual way from this crude base and it is recrystallised from methylethyl ketone. The 3-ethylsulphonyl-5-[(3-dimethylamino-2-methyl)-propyl]-iminodibenzyl hydrochloride melts at 208.5–210.5°.

*Example 12*

(a) 27.3 parts of 3-methylsulphonyl-iminodibenzyl are heated in 850 parts by volume of abs. xylene at 100°. 17.1 parts of 1-bromo-2-methyl-3-chloropropane are added and then 4.3 parts of sodium amide pulverised in abs. toluene are added dropwise. The reaction mixture is refluxed for 14 hours. After cooling, the sodium bromide formed is washed out with water, the xylene solution is dried with sodium sulphate and concentrated. The crude product is worked up direct.

(b) 36.3 parts of this crude product in 800 parts by volume of abs. toluene containing 9.3 parts of methylamine are heated in an autoclave for 16 hours at 80°. The solvent and excess methylamine are distilled off, the residue is taken up in water and extracted with ether. On concentrating the dried ether solution, 3-methylsulphonyl-5-(3-methylamino-2-methylpropyl)-iminodibenzyl is obtained which can be converted into the crystalline hydrochloride.

If in the above reaction, 13.5 parts of dimethylamine are used instead of methylamine, then 3-methylsulphonyl-5-(3-dimethylamino-2-methyl-propyl)-iminodibenzyl hydrochloride is obtained in an analogous way. Recrystallised from methylethyl ketone, it melts at 228.5–231°.

On reacting 10 parts of 4-methylpiperazine and 27.6 parts of potassium carbonate instead of the methylamine used above, in an open vessel, 3-methylsulphonyl-5-[3'-(4''-methyl-1''-piperazinyl)-2-methyl-propyl]-iminodibenzyl or its hydrochloride is obtained. The former crystallises from a little ether and melts at 126–127°.

Finally, on reacting, in an open vessel, 11.5 parts of N-hydroxyethyl-piperazine and 27.6 parts of potassium carbonate instead of the methylamine used above, 3-methylsulphonyl - 5 - [3' - (4'' - hydroxyethyl - 1''' - piperazinyl)-2'-methyl-propyl]-iminodibenzyl is obtained.

Example 13

(a) 27.3 parts of 3-methylsulphonyl-iminodibenzyl in 850 parts by volume of abs. xylene are heated to 100°. 15.8 parts of 3-chloro-1-bromopropane are then added whereupon 4.3 parts of sodium amide pulverised is abs. toluene are added dropwise. The reaction mixture is refluxed for 14 hours. After cooling, the sodium bromide formed is washed out with water, the xylene solution is dried with sodium sulphate and concentrated. The crude product is further worked up direct.

(b) 35 parts of the above crude 3-methylsulphonyl-5-(3-chloro-1-propyl)-iminodibenzyl are dissolved in 800 parts by volume of toluene- (however, the xylene solution containing sodium bromide can also be used direct) 9.3 parts of methylamine in toluene are added and the whole is heated for 16 hours in an autoclave at 80°. The solvent is distilled off with excess methylamine, water is added to the residue and it is extracted with ether.

The dried ether solution is concentrated and the 3-methylsulphonyl-5-(3-methylamine-propyl)-iminodibenzyl hydrochloride is obtained therefrom with ethereal hydrochloric acid.

Example 14

27.3 pars of 3-methylsulphony-iminodibenzyl are dissolved at 85° in 850 parts by volume of abs. xylene and 19.8 parts of 3-(N-methyl-N-benzylamino)-propyl chloride are added. 4.3 parts of sodium amide pulverised in toluene are then added dropwise and the reaction mixture is stirred for 17 hours at 130°. The reaction mixture is then cooled and washed with water. The dried solution is concentrated whereupon crude 3-methylsulphonyl-5-(3-N - benzyl - N - methylamino - 1 - propyl) - iminodibenzyl remains.

The above crude produc is dissolved in 190 parts by volume of dioxan, 10 parts by volume of water and 10 parts of Raney nickel are added and the whole is hydrogenolytically debenzylated for 2 hours at 80° under 30 atmospheres of hydrogen pressure. The catalyst is filtered off and the solution is concentrated. Water is added to the residue which is then extracted with ether. The 3-methylsulphonyl - 5 - (3 - methylamino - 1-propyl-iminodibenzyl hydrochloride is obtained with ethereal hydrochloric acid from the dried ether solution.

Example 15

(a) 27.3 parts of 3-methylsulphonyl-iminodibenzyl are dissolved in 1000 parts by volume of abs. toluene. Phosgene is introduced for 4 hours at 85–95°. Then the excess phosgene, dissolved in toluene is removed by bubbling a strong stream of nitrogen through the reaction solution for 1 hour at 95°. After concentrating, the 3-methylsulphonyl-5-chlorocarbonyl-iminodibenzyl crystallises. Recrystallised from a little benzene, the pure product melts at 164–165°.

3-ethylsulphonyl-5-chlorocarbonyl-iminodibenzyl is obtained in an analogous manner from 28.7 parts of 3-ethylsulphonyl-iminodibenzyl. The product melts at 142.5–144°.

(b) 33.5 parts of 3-methylsulphonyl-5-chlorocarbonyl-iminodibenzyl and 20.6 parts of 3-dimethylamino-1-propanol in toluene are refluxed for 15 hours. After cooling, the reaction mixture is shaken with 70 parts by volume of 2 n-caustic soda lye and the phases separated. The toluene solution is washed with water, dried and concentrated. The residue, crude 3-methylsulphonyl-5-(3-dimethylamino-1-propoxycarbonyl)-iminodibenzyl, is then heated at 220° under waterjet vacuum until no more carbon dioxide is developed. The pprolysate is taken up in hot hexane. On cooling, the 3-methylsulphony-5-(3-dimethylamino-1-propyl)-iminodibenzyl crystallises. If necessary, it is recrystallised a second time. The pure product melts at 110–111° and is identical with the compound described in Example 1d, In an analogous manner, the basic esters from 33.5 parts of 3-methylsulphonyl-5-chlorocarbonyl-iminodibenzyl and 23.4 parts of 3-dimethylamino-2-methyl-1-propanol is produced and pyrolysed. The pyrolysate is chromatographed through a column of neutral $Al_2O_3$ (or distilled under high vacuum) and the base is converted into the hydrochloride with ethereal hydrochloric acid. Recrystallised from methylethyl ketone, the pure 3-methylsulphonyl - 5- ( 3 - dimethylamino - 2 - methy - propyl) - 1-iminodibenzyl-hydrochloride melts at 229–231° and is identical with the product described in Example 10.

In an analogous manner, the hydrochloride of 3-ethylsulphonyl - 5 - (3 - dimethylamino - 2 - methyl - 1 - propyl)-iminodibenzyl (M.P. 209–210.5°) is obtained from 3-ethylsulphonyl-5-chlorocarbonyl-iminodibenzyl and 23.4 parts of 3-dimethylamino-2-methyl-1-propanol. It is identical with the compound described in Example 11.

Example 16

41.6 parts of 3-methylsulphonyl-5-[3-(N-carbethoxy-N-methylamino)-1-propyl]-iminodibenzyl are dissolved in 1500 parts by volume of abs. ether and 6 parts of lithium aluminium anhydride in 50 parts by volume of ether are added dropwise within 15 minutes while stirring. The whole is then refluxed for 4½ hours. 6 parts by volume of water are added dropwise, then 6 parts by volume of 15% caustic soda lye and finally another 18 parts by volume parts of water are added. The white precipitate is filered off, thoroughly washed with ether and the combined ether solutions are evaporated to dryness. The oil crystallises from hexane. The pure 3-methylsulphonyl-5-(3-dimethylamino-1-propyl)-iminodibenzyl melts at 110–110.5°.

Example 17

38.6 parts of 3-methylsulphonyl-5-[-3-(N-acetyl-N-methyl)-amino-1-propyl]-iminodibenzyl, (produced from 3-methylsulphonyl-iminodibenzyl and N-3-chloropropyl-N-methylacetamide analogously to Example 9b, or from 3 - methylsulphonyl - 5 - (3 - methylamino - 1 - propyl)-iminodibenzyl and acetanhydride), are dissolved in 1500 parts by volume of abs. ether and this solution is added dropwise to 6 parts of lithium aluminium hydride in 50 parts by volume of ether. After refluxing for 5 hours, 6 parts by volume of water are carefully added whereupon 6 parts by volume of 15% caustic soda lye and then 18 parts by volume of water are added dropwise. The white precipitate is filtered off and washed with ether. Ethereal hydrochloric acid is added to the ether solutions whereupon the hydrochloride of 3-methylsulphonyl-5-[3-(N-ethyl - N - methyl) - amino - 1 - propyl] - iminodibenzyl precipitates. It is recrystallised from acetone or methylethyl ketone.

In another aspect, this invention involves intermediate products for the synthesis of the above mentioned compounds of general Formula I, namely compounds of general Formula XI

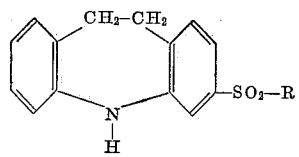

(XI)

wherein R is the methyl or ethyl radical, as well as the 5-acyl derivatives thereof, especially the 5-acetyl compounds and the 5-acyl-iminodibenzyl-3-sulfinic acids.

Compounds of general Formula XI can be produced by converting a 3-amino-5-acyl-iminodibenzyl, especially the 3-amino-5-acetyl-iminodibenzyl into its diazonium salt, converting the latter via the 3-chlorosulfonyl compound into the 5-acyl-iminodibenzyl-3-sulfinic acid, esterifying the latter with a low alkanol, preferably by reacting one of its salts with the reactive ester of methanol or ethanol, and hydrolysing the resulting 3-methyl- or 3-ethyl sulfonyl-5-acyl-iminodibenzyl to a compound of the general Formula XI. The above reaction sequence is illustrated by the following formulae wherein R′ is an acyl radical, especially the acetyl radical, and R is as defined under Formula XI:

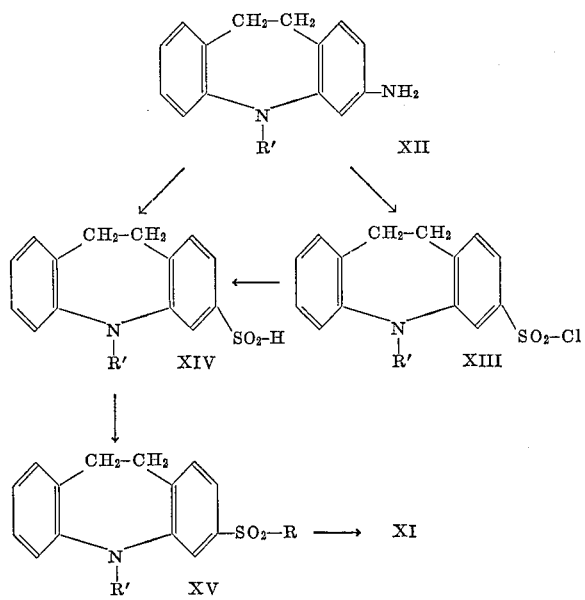

Compounds of the general Formula XI are intermediate products for the preparation of compounds with valuable pharmacological properties, as described above.

3-amino-5-acetyl iminodibenzyl as well as 3-amino-5-carbomethoxy iminodibenzyl are especially suitable starting materials for the process according to the invention. The 3-amino-5-acetyl iminodibenzyl can be produced for example by condensing 5-acetyl iminodibenzyl with acetyl chloride in the presence of aluminium chloride and treating the resulting 3,5-diacetyl iminodibenzyl with hydrazoic acid by the Schmidt method and finally partially hydrolysing the resulting 3-acetylamino-5-acetyl iminodibenzyl.

To convert into 5-acyl-iminodibenzyl-3-sulphinic acid, the 3-amino-5-acyl-iminodibenzyls dissolved in mineral acid or preferebaly the diazonium salts in diluted sulphuric acid are saturated in the cold with sulphur dioxide and slowly reacted with copper dust while introducing sulphur dioxide.

The resulting sulphinic acid can be isolated for example by extracting with suitable organic solvents, such as e.g. chloroform or ethyl acetate.

Instead of converting the 3-amino-5-acyl iminodibenzyl diazonium salts, especially diazonium sulphates, directly into 5-acyl-imino-dibenzyl-3-sulphinic acids, the corresponding diazonium chlorides can be treated with sulphur dioxide in the presence of hydrochloric acid with the addition of copper chloride in acetic acid, and the resulting 3-chlorosulphonyl-5-acyl-iminodibenzyls can be reduced by known methods to the corresponding sulphinic acids, for example with zinc and hydrochloric acid in acetic acid solution or preferably with sodium sulphite in alkaline solution.

In the following step of the reaction sequence salts of 5-acyl-iminodibenzyl-3-sulphinic acids, especially alkali metal salts of 5-acetyl-iminodibenzyl-3-sulphinic acid, are reacted by heating with, for example, methyliodide, methylbromide, ethyliodide, ethylbromide, ethylchloride, dimethylsulphate or diethylsulphate in a suitable organic medium, such as e.g. methanol, ethanol, propanol, isopropanol or butanol. Depending on the boiling temperature of the reactive ester to be reacted and of the solvent, as well as on the required reaction temperature, the reaction is performed in a closed vessel if necessary.

The cleavage of the acyl radical R′ is caused, for example, by boiling the 3-alkylsulphonyl-5-acyl-iminodibenzyls with potash lye or with soda lye in a hydroxy compound of suitable boiling point and solvent properties e.g. in ethylene glycol.

The following examples further illustrate the process according to this aspect of the invention. Parts therein are parts by weight, their relationship to parts by volume is as that of grammes to cubic centimetres. The temperatures are in degrees centigrade.

*Example 18*

5-acetyl-iminodibenzyl-3-sulfinic acid, being described in Examples 1a and 1b, may also be prepared in the following manner:

25.2 parts of 3-amino-5-acetyl-iminodibenzyl dissolved in 150 parts by volume of water and 30 parts by volume of concentrated sulfuric acid are diazotized, while stirring at 0° with 7 parts of sodium nitrite in 20 parts by volume of water. Thereupon the solution is saturated with sulfur dioxide while cooling in a salt-ice bath, with continued limited introduction of sulfur dioxide, copper dust is added in small amounts. After no more nitrogen is given off, the sulfinic acid is extracted with chloroform and the dried extract is concentrated. Recrystallised from acetone-ether, the 5-acetyl-iminodibenzyl-3-sulfinic acid melts at 154° with decomposition (identical with the product as described in Example 1b.)

*Example 19*

A further process for the production of 5-acetyl-iminodibenzyl-3-sulfinic acid resulting in an especially pure and stable product is as follows: 37 parts of crystalline sodium sulphite are dissolved in 80 parts by volume of water and heated to 65°; 33.6 parts of 3-chlorosulfonyl-5-acetyl-iminodibenzyl are then added in portions. The sulfonylchloride is quickly reduced and the sodium salt of the sulfinic acid goes into solution.

The solution is kept alkaline to phenolphthalein by a simultaneous addition of 45% soda lye (total 18 parts by volume). The clear brown solution is poured while stirring onto 10 parts by volume of concentrated hydrochloric acid and 50 parts by volume ice water. The sulfinic acid precipitates and is extracted with ethyl acetate. The extract is washed with a saturated sodium chloride solution and concentrated. The crystalline sulfinic acid is obtained in high yield and sufficiently pure for further reaction (yield 95% content 85% sulfinic acid). On recrystallising the crude product (decomp. 150°), the pure sulfinic acid is obtained, decomposition at 154°. This sulfinic acid is stable and can be stored for a long period of time.

I claim:

1. Iminodibenzyl derivatives having the formula

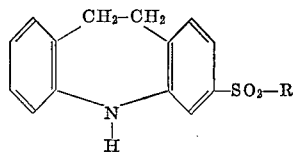

in which R is member selected from the group consisting of methyl and ethyl.

2. 3-methylsulfonyl-iminodibenzyl.

3. 3-ethylsulfonyl-iminodibenzyl.
4. 5-acetyl iminodibenzyl-3-sulfinic acid.
5. 3-methylsulfonyl-5-acetyl-iminodibenzyl.
6. 3-ethylsulfonyl-5-acetyl-iminodibenzyl.

References Cited

UNITED STATES PATENTS

| 2,905,668 | 9/1959 | Jacob et al. | 260—243 |
| 2,965,639 | 12/1960 | Schindler et al. | 260—239 |
| 3,038,896 | 6/1962 | Habicht et al. | 260—239 |
| 3,040,031 | 6/1962 | Dietrich | 260—239 |
| 3,056,774 | 10/1962 | Dietrich et al. | 260—239 |
| 3,056,775 | 10/1962 | Schindler | 260—239 |

OTHER REFERENCES

Hollister, Ann. Int. Med., vol. 51, p. 1041 (1959), 260—239.

Wagner et al., Synthetic Organic Chemistry (New York,, 1953), pp. 801–802. QD262 W24.

ALEX MAZEL, *Primary Examiner.*

NICHOLAS RIZZO, *Examiner.*

A. D. ROLLINS, *Assistant Examiner.*